(12) United States Patent
Kurihara et al.

(10) Patent No.: US 9,493,929 B2
(45) Date of Patent: Nov. 15, 2016

(54) DISPLAY SYSTEM OF EXCAVATING MACHINE AND EXCAVATING MACHINE

(71) Applicant: Komatsu Ltd., Tokyo (JP)

(72) Inventors: Takashi Kurihara, Hiratsuka (JP); Daishi Iwanaga, Bungo ono (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 14/442,162

(22) PCT Filed: Nov. 11, 2013

(86) PCT No.: PCT/JP2013/080458
§ 371 (c)(1),
(2) Date: May 12, 2015

(87) PCT Pub. No.: WO2014/077221
PCT Pub. Date: May 22, 2014

(65) Prior Publication Data
US 2016/0010312 A1   Jan. 14, 2016

(30) Foreign Application Priority Data
Nov. 19, 2012 (JP) ................. 2012-253600

(51) Int. Cl.
*E02F 9/26* (2006.01)
*E02F 3/43* (2006.01)
(Continued)

(52) U.S. Cl.
CPC ............. *E02F 9/265* (2013.01); *E02F 3/435* (2013.01); *E02F 9/2012* (2013.01); *E02F 9/261* (2013.01);
(Continued)

(58) Field of Classification Search
CPC ............ E02F 9/265; E02F 3/435; E02F 9/261; E02F 9/264; E02F 9/2012; G01S 19/54; G06T 11/203
(Continued)

(56) References Cited

U.S. PATENT DOCUMENTS

| 8,942,895 B2 | 1/2015 | Nomura et al. |
| 2005/0027420 A1* | 2/2005 | Fujishima ............. E02F 9/2045 701/50 |
| 2011/0178677 A1* | 7/2011 | Finley ..................... E02F 9/265 701/31.4 |

FOREIGN PATENT DOCUMENTS

| JP | 2001-132021 A | 5/2001 |
| JP | 2001-159156 A | 6/2001 |

(Continued)

OTHER PUBLICATIONS

International Search Report mailed Jan. 28, 2014, issued for PCT/JP2013/080458.

*Primary Examiner* — Richard Camby
(74) *Attorney, Agent, or Firm* — Locke Lord LLP

(57) ABSTRACT

A display system of an excavating machine including a work machine with a bucket and a main body part to which the work machine is attached, includes: a storage storing positional information of a design surface indicating a design land shape and outer shape information of the bucket; and a processor determining, among measurement reference points predetermined along an outer shape of a buttock part of the bucket for measuring a position, including at least a tip of the bucket, a measurement reference point closest to the design surface, based on information on a current position of the excavating machine, information on a posture of the main body part, information on a position of the tip of the bucket, and the outer shape information of the bucket.

14 Claims, 15 Drawing Sheets

(51) Int. Cl.
 *E02F 9/20* (2006.01)
 *G06T 11/20* (2006.01)
 *G01S 19/54* (2010.01)

(52) U.S. Cl.
 CPC ............ *E02F 9/264* (2013.01); *G06T 11/203* (2013.01); *G01S 19/54* (2013.01)

(58) Field of Classification Search
 USPC .......................................................... 701/36
 See application file for complete search history.

(56) References Cited

FOREIGN PATENT DOCUMENTS

| JP | 2006-214246 A | 8/2006 |
| JP | 2012-172425 A | 9/2012 |

\* cited by examiner

| REGISTRA-TION IDEN-TIFICATION CODE | KIND IDENTIFI-CATION CODE | BUTTOCK PART A | | BUTTOCK PART B | | BUTTOCK PART C | | BUTTOCK PART D | | BUTTOCK PART E | |
|---|---|---|---|---|---|---|---|---|---|---|---|
| | | LENGTH | AN-GLE | LENGTH | AN-GLE | LENGTH | AN-GLE | LENGTH | AN-GLE | LENGTH | AN-GLE |
| 1 | 1 | a.a | θa | b.b | θb | c.c | θc | d.d | θd | e.e | θe |
| 2 | 1 | ⋮ | ⋮ | ⋮ | ⋮ | ⋮ | ⋮ | ⋮ | ⋮ | ⋮ | ⋮ |
| ⋮ | ⋮ | ⋮ | ⋮ | ⋮ | ⋮ | ⋮ | ⋮ | ⋮ | ⋮ | ⋮ | ⋮ |
| 5 | 2 | ⋮ | ⋮ | ⋮ | ⋮ | ⋮ | ⋮ | ⋮ | ⋮ | ⋮ | ⋮ |

1: STANDARD BUCKET
2: TILT BUCKET

DISPLAY SYSTEM OF EXCAVATING MACHINE AND EXCAVATING MACHINE

FIELD

The present invention relates to a display system of an excavating machine and an excavating machine including the display system.

BACKGROUND

Generally, an operator operates an operating lever of an excavating machine such as an excavator, and a work machine including a bucket is thereby driven to excavate the ground or the like as a work object. For example, Patent Literature 1 describes a technique of displaying a design difference and a bucket shape on a screen to be obtained in a work requiring accuracy by a backhoe, such as slope finishing. Patent Literature 2 describes a technique of a display system of a construction machine. In the system, a bucket symbol is displayed in accordance with a kind of the bucket actually included in the machine at present so that an excavating operation can be performed accurately.

CITATION LIST

Patent Literature

Patent Literature 1: Japanese Laid-open Patent Publication No. 2006-214246
Patent Literature 2: Japanese Laid-open Patent Publication No. 2001-132021

SUMMARY

Technical Problem

When excavating the ground as a work object using an excavating machine such as an excavator while a part of a design surface as an operation object is set as a target surface, an operator of the excavating machine particularly needs distance information near the design surface. According to the techniques of Patent Literatures 1 and 2, the bucket shape is displayed. Therefore, an operator needs to operate while watching a screen of a display device and checking by visual observation or monitoring. Therefore, according to the techniques of Patent Literatures 1 and 2, when a part of a design surface as an operation object is a target surface, information on the shortest distance between the target surface and the bucket cannot be recognized, and particularly the ground beyond the design surface may be excavated by a buttock part of the bucket.

An object of the present invention is to understandably provide information on the shortest distance between the design surface and the bucket, relating to an operation result, to an operator of an excavating machine when the operator operates in accordance with the design surface.

Solution to Problem

According to the present invention, a display system of an excavating machine including a work machine with a bucket and a main body part to which the work machine is attached, comprises: a work machine condition detector configured to detect information on a current position of the excavating machine, information on a posture of the main body part, and information on a position of a tip of the bucket; a storage unit configured to store positional information of a design surface indicating a design land shape and outer shape information of the bucket; and a processing unit configured to determine, among a plurality of measurement reference points predetermined along an outer shape of a buttock part of the bucket for measuring a position, including at least the tip of the bucket, a measurement reference point closest to the design surface, based on the information on the current position of the excavating machine, the information on the posture of the main body part, the information on the position of the tip of the bucket, and the outer shape information of the bucket.

In the present invention, it is preferable that the processing unit determines a distance between the measurement reference point and the design surface in a normal direction of the design surface as a design surface distance, and displays information corresponding to a minimum value of the design surface distance as a shortest distance on a screen of a display device.

In the present invention, it is preferable that the plurality of measurement reference points is predetermined along a cross section obtained by cutting the outer shape of the bucket with a plane parallel to a moving direction of the bucket and along a width direction of the bucket, and the processing unit determines a distance between the measurement reference point and the design surface in a normal direction of the design surface as a design surface distance, and displays information corresponding to a minimum value of the design surface distance as a shortest distance on a screen of a display device.

In the present invention, it is preferable that when there is a same measurement reference point in a plurality of normal directions of the design surfaces, the processing unit determines a plurality of design surface distances for the same measurement reference point.

In the present invention, it is preferable that the processing unit emits an alarm based on the shortest distance.

In the present invention, it is preferable that the processing unit changes a mode of emitting a sound as the alarm in accordance with the shortest distance.

In the present invention, it is preferable that the processing unit displays an image specifying a measurement reference point closest to the design surface on the screen of the display device.

In the present invention, it is preferable that the image specifying the measurement reference point closest to the design surface is an image indicating the normal line of the design surface.

According to the present invention, a display system of an excavating machine including a work machine with a bucket and a main body part to which the work machine is attached, comprises: a work machine condition detector configured to detect information on a current position of the excavating machine, information on a posture of the main body part, and information on a position of a tip of the bucket; a storage unit configured to store positional information of a design surface indicating a design land shape and outer shape information of the bucket; a processing unit configured to determine, among a plurality of measurement reference points predetermined along an outer shape of a buttock part of the bucket for measuring a position, including at least the tip of the bucket, a measurement reference point closest to the design surface, based on the information on the current position of the excavating machine, the information on the posture of the main body part, the information on the position of the tip of the bucket, and the outer shape information of the bucket, and to determine a distance between the measurement reference point closest to the design surface and the design surface in a normal direction of the design surface as a design surface distance; and a display device configured to display at least one of the design surface distance and an image indicating the normal line of the design surface passing through the measurement reference point closest to the design surface.

According to the present invention, an excavating machine comprises the display system of an excavating machine.

The present invention can understandably provide information on the shortest distance between the design surface and the bucket, relating to an operation result, to an operator of an excavating machine when the operator operates in accordance with the design surface.

DESCRIPTION OF EMBODIMENTS

An embodiment to carry out the present invention will be described in detail with reference to the drawings. The present invention is not limited by the description of the following embodiment. In the following embodiment, an excavator will be described as an example of an excavating machine. However, the applicable excavating machine is not limited to the excavator as long as the excavating machine is a construction machine which works while being equipped with an attachment such as a bucket. The embodiment may be applied to, for example, a backhoe loader, as the construction machine.

<Overall Configuration of Excavating Machine>

Figure 1:
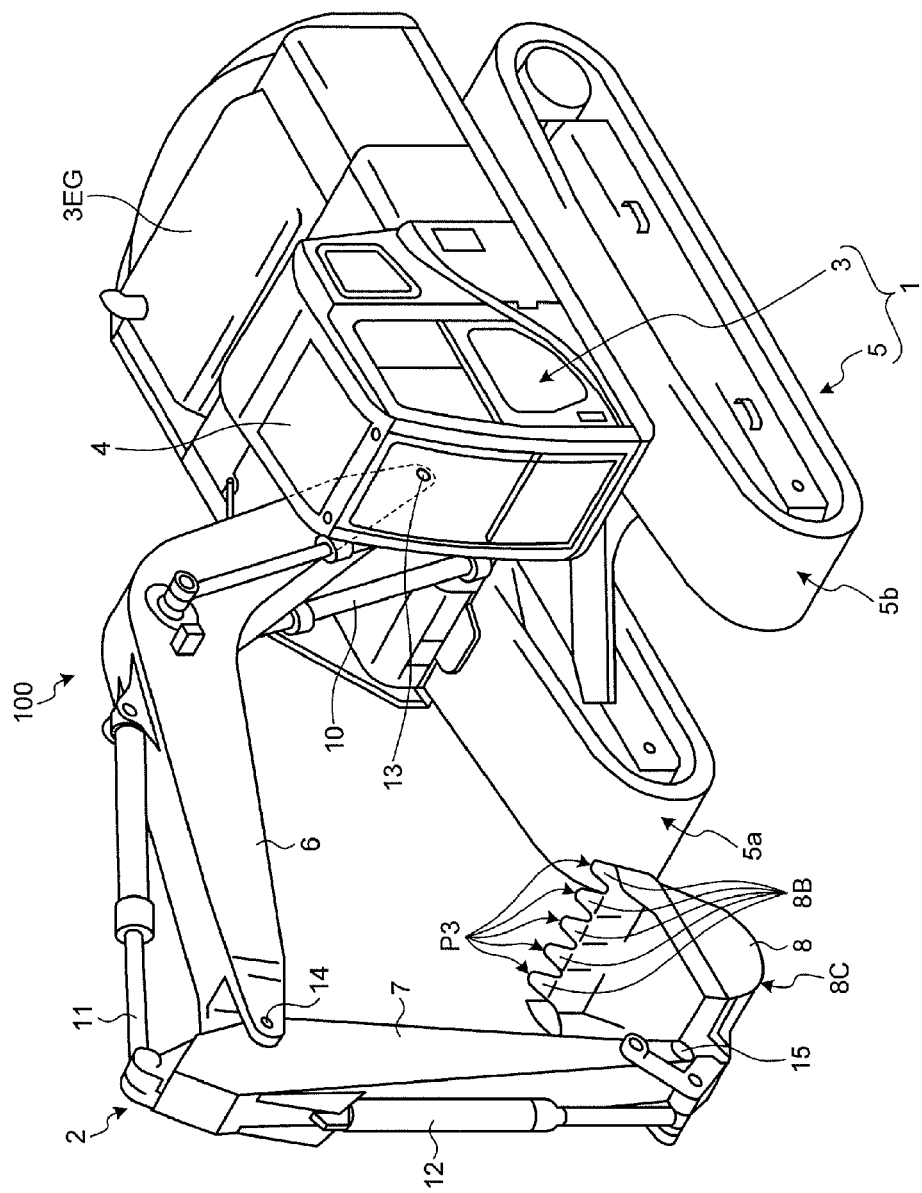
FIG. 1 is a perspective view of an excavator 100 according to the present embodiment.
Figure 2:
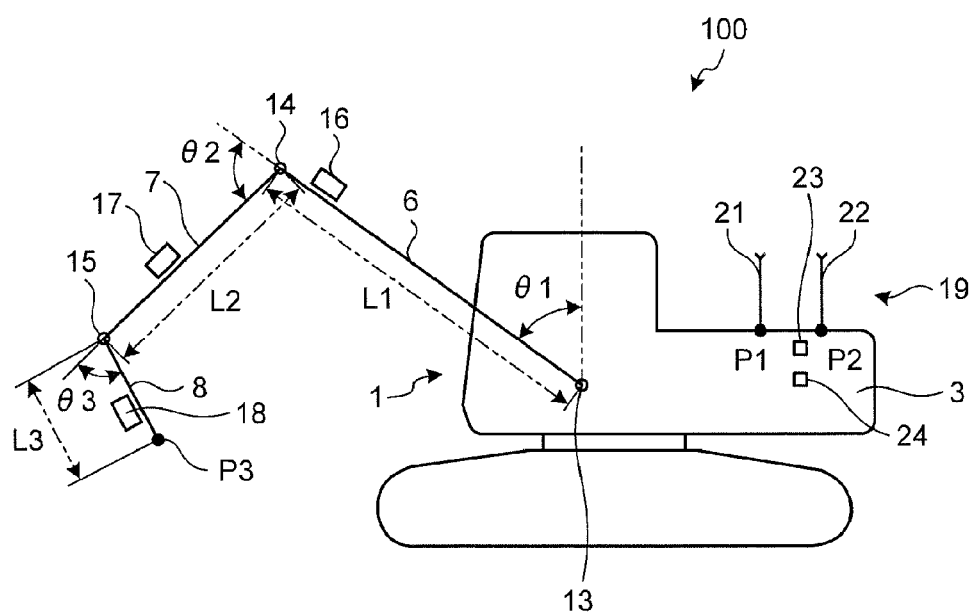
FIG. 2 is a side view of the excavator 100.
Figure 3:
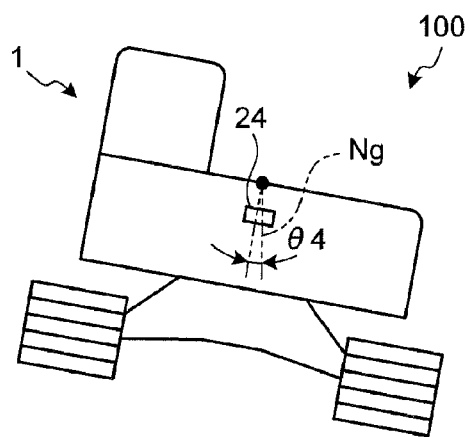
FIG. 3 is a back view of the excavator 100.
Figure 4:
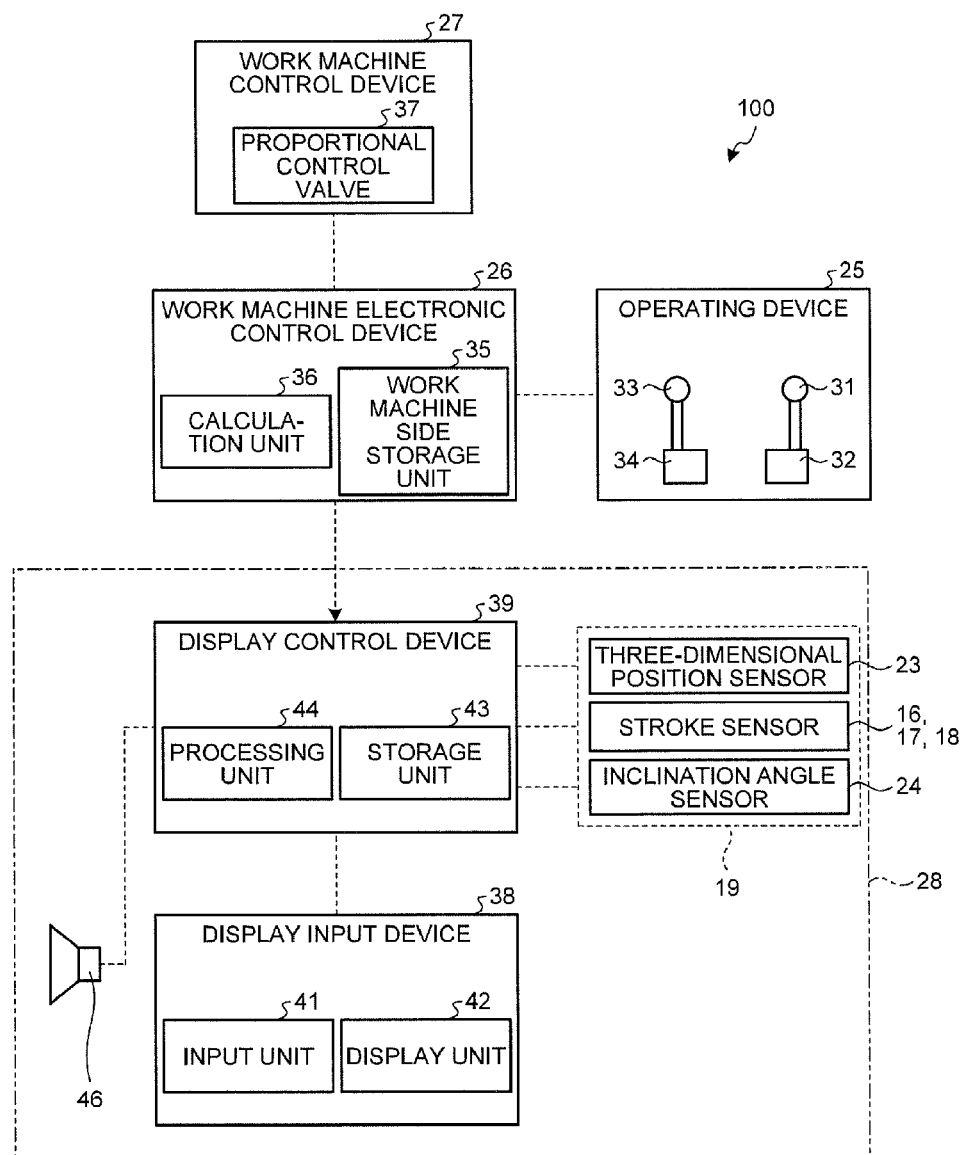
FIG. 4 is a block diagram illustrating a control system included in the excavator 100.
Figure 5:
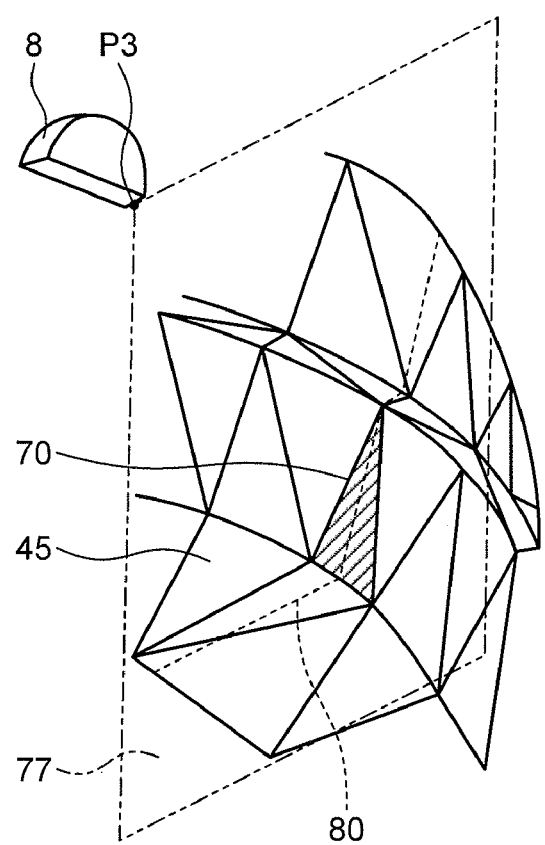
FIG. 5 is a view illustrating a design land shape illustrated by design land shape data.

FIG. 1 is a perspective view of an excavator 100 according to the present embodiment. FIG. 2 is a side view of the excavator 100. FIG. 3 is a back view of the excavator 100. FIG. 4 is a block diagram illustrating a control system included in the excavator 100. FIG. 5 is a view illustrating a design land shape illustrated by design land shape data. In the present embodiment, the excavator 100 as an excavating machine includes a main vehicle body 1 as a main body part and a work machine 2. The main vehicle body 1 includes an upper swing body 3 and a travel unit 5. The upper swing body 3 accommodates devices such as a power generator and a hydraulic pump (not illustrated) in an engine room 3EG. The engine room 3EG is disposed at one end of the upper swing body 3.

In the excavator 100 of the present embodiment, an internal combustion engine such as a diesel engine is used as a power generator. However, the excavator 100 is not limited to such a structure. For example, the excavator 100 may include a so-called hybrid type power generator in which an internal combustion engine, a generator motor, and a storage battery are combined.

The upper swing body 3 includes a driving room 4. The driving room 4 is disposed at the other end of the upper swing body 3. That is, the driving room 4 is disposed on the opposite side of the engine room 3EG. In the driving room 4, a display input device 38 and an operating device 25 are disposed, as illustrated in FIG. 4. These will be described later. The travel unit 5 includes crawlers 5a and 5b. The travel unit 5 travels by driving of a hydraulic motor (not illustrated) and rotation of the crawlers 5a and 5b to make the excavator 100 travel. The work machine 2 is attached to a side of the driving room 4 in the upper swing body 3. The excavator 100 may include tires in place of the crawlers 5a and 5b, and may include a travel unit which can travel by transmitting a drive force of a diesel engine (not illustrated) to the tires via a transmission. For example, a wheel type excavator may be used as the excavator 100 in such a form. The excavator 100 may be, for example, a backhoe loader which includes such a travel unit with tires, and a work machine attached to a main vehicle body (main body part), and does not include an upper swing body or a swing mechanism thereof as illustrated in FIG. 1. That is, the backhoe loader includes the work machine attached to the main vehicle body, and the travel unit as a part of the main vehicle body.

In the upper swing body 3, a side on which the work machine 2 and the driving room 4 are disposed is the front, and a side on which the engine room 3EG is disposed is the rear. The left side toward the front is the left of the upper swing body 3. The right side toward the front is the right of the upper swing body 3. In the excavator 100 or the main vehicle body 1, the side of the travel unit 5 is a lower side based on the upper swing body 3, and the side of the upper swing body 3 is an upper side based on the travel unit 5. When the excavator 100 is put on a horizontal plane, the downward direction is a vertical direction, that is, a direction in which gravity acts, and the upward direction is opposite to the vertical direction.

The work machine 2 includes a boom 6, an arm 7, a bucket 8, a boom cylinder 10, an arm cylinder 11, and a bucket cylinder 12. A base end of the boom 6 is swingably attached to the front of the main vehicle body 1 via a boom pin 13. A base end of the arm 7 is swingably attached to a tip of the boom 6 via an arm pin 14. The bucket 8 is swingably attached to a tip of the arm 7 via a bucket pin 15.

As illustrated in FIG. 2, the length of the boom 6, i.e., the length from the center of the boom pin 13 to the arm pin 14 is L1. The length of the arm 7, i.e., the length from the center of the arm pin 14 to the center of the bucket pin 15 is L2. The length of the bucket 8, i.e., the length from the center of the bucket pin 15 to the blade tip P3 of the bucket 8 is L3. The blade tip P3 is a tip of a blade 8B attached to the bucket 8 on the opposite side of the bucket pin 15. The tip of the blade 8B is a tip of the bucket 8, where an excavating force of the work machine 2 is generated. An outer shape of the bucket 8 from the bucket pin 15 to the blade tip P3 is usually protruded, and referred to as a buttock part 8C.

Each of the boom cylinder 10, the arm cylinder 11, and the bucket cylinder 12 illustrated in FIG. 1 is a hydraulic cylinder driven by pressure of hydraulic oil (hereinafter, appropriately referred to as oil pressure). The boom cylinder 10 drives the boom 6 to elevate and lower the boom 6. The arm cylinder 11 drives the arm 7 to make the arm 7 turn around the arm pin 14. The bucket cylinder 12 drives the bucket 8 to make the bucket 8 turn around the bucket pin 15. A proportional control valve 37 illustrated in FIG. 4 is disposed between the hydraulic cylinder such as the boom cylinder 10, the arm cylinder 11, and the bucket cylinder 12, and the hydraulic pump (not illustrated). A work machine electronic control device 26 described later controls the proportional control valve 37, and thus a flow rate of the hydraulic oil supplied to the boom cylinder 10, the arm cylinder 11, and the bucket cylinder 12 is controlled. As a result, operations of the boom cylinder 10, the arm cylinder 11, and the bucket cylinder 12 are controlled.

As illustrated in FIG. 2, the boom 6, the arm 7, and the bucket 8 are provided with a first stroke sensor 16, a second stroke sensor 17, and a third stroke sensor 18, respectively. The first stroke sensor 16 detects a stroke length of the boom cylinder 10. A display control device (see FIG. 4) described later calculates an inclination angle $\theta1$ of the boom 6 with respect to a Za axis in a main vehicle body coordinate system described later using the stroke length of the boom cylinder 10 detected by the first stroke sensor 16. The second stroke sensor 17 detects a stroke length of the arm cylinder 11. The display control device 39 calculates an inclination angle $\theta2$ of the arm 7 with respect to the boom 6 using the stroke length of the arm cylinder 11 detected by the second stroke sensor 17. The third stroke sensor 18 detects a stroke length of the bucket cylinder 12. The display control device 39 calculates an inclination angle $\theta3$ of the bucket 8 with respect to the arm 7 using the stroke length of the bucket cylinder 12 detected by the third stroke sensor 18.

The main vehicle body 1 includes a work machine condition detector 19. The work machine condition detector 19 detects a current position of the excavator 100, a posture of the main vehicle body 1, and a current position of the blade tip P3. The work machine condition detector 19 includes two real time kinematic-global navigation satellite systems (RTK-GNSS) antennas 21 and 22 (hereinafter, appropriately referred to as GNSS antennas 21 and 22), a three-dimensional position sensor 23, an inclination angle sensor 24, the first stroke sensor 16, the second stroke sensor 17, and the third stroke sensor 18. The GNSS antennas 21 and 22 are disposed on the main vehicle body 1, more specifically, on the upper swing body 3. In the present embodiment, the GNSS antennas 21 and 22 are disposed at a fixed interval along a Ya axis in the main vehicle body coordinate system described later. The GNSS antennas 21 and 22 may be disposed at a fixed interval along an Xa axis in the main vehicle body coordinate system. The GNSS antennas 21 and 22 may be disposed at a fixed interval in a plane of the Xa axis—the Ya axis in the main vehicle body coordinate system. The GNSS antennas 21 and 22 are preferably disposed at both ends located away from each other in the lateral direction of the excavator 100, on the upper swing body 3. The GNSS antennas 21 and 22 may be disposed at a counterweight (the rear end of the upper swing body 3) (not illustrated) or in the rear part of the driving room 4, on the upper swing body 3. In any case, when the GNSS antennas 21 and 22 are disposed at positions as far away from each other as possible, detection accuracy of the current position of the excavator 100 is higher. The GNSS antennas 21 and 22 are preferably disposed at positions to avoid obstructing a visual field of an operator as much as possible. The work machine condition detector 19 can detect a vehicle condition, such as a current position or a posture of the excavating machine (the excavator 100 in the present embodiment).

Signals corresponding to GNSS radio waves, received by the GNSS antennas 21 and 22, are input to the three-dimensional position sensor 23. The three-dimensional position sensor 23 detects setting positions P1 and P2 of the GNSS antennas 21 and 22. As illustrated in FIG. 3, the inclination angle sensor 24 detects an inclination angle $\theta4$ (hereafter, appropriately referred to as roll angle $\theta4$) in a width direction of the main vehicle body 1 with respect to the direction in which gravity acts, i.e., a vertical direction Ng. In the present embodiment, the width direction indicates a width direction of the bucket 8, and coincides with a width direction, i.e., a lateral direction of the upper swing body 3. However, when the work machine 2 includes a tilt bucket described later, the width direction of the bucket may not coincide with the width direction of the upper swing body 3.

The excavator 100 includes the operating device 25, the work machine electronic control device 26, a work machine control device 27, and a display system of the excavating machine (hereinafter, appropriately referred to as a display system) 28. The operating device 25 includes a work machine operation member 31, a work machine operation detecting unit 32, a travel operation member 33, and a travel operation detecting unit 34. The work machine operation member 31 is a member for allowing an operator to operate the work machine 2, and is, for example, a joy stick or an operating lever. The work machine operation detecting unit 32 detects the contents of the operation performed by the work machine operation member 31, and sends the contents to the work machine electronic control device 26 as a detection signal. The travel operation member 33 is a member for allowing an operator to operate travel of the excavator 100, and is, for example, a joy stick or an operating lever. The travel operation detecting unit 34 detects the contents of the operation performed by the travel operation member 33, and sends the contents to the work machine electronic control device 26 as a detection signal.

The work machine electronic control device 26 includes a work machine side storage unit 35 including a random access memory (RAM) and/or a read only memory (ROM), and a calculation unit 36 such as a central processing unit (CPU). The work machine electronic control device 26 mainly controls the work machine 2. The work machine electronic control device 26 generates a control signal for causing the work machine 2 to be operated according to the operation of the work machine operation member 31, and outputs the signal to the work machine control device 27. The work machine control device 27 includes the proportional control valve 37, and the proportional control valve 37 is controlled based on the control signal from the work machine electronic control device 26. Hydraulic oil is drained from the proportional control valve 37 at a flow rate corresponding to the control signal from the work machine electronic control device 26, and is supplied to at least one of the boom cylinder 10, the arm cylinder 11, and the bucket cylinder 12. Then, the boom cylinder 10, the arm cylinder 11, and the bucket cylinder 12 illustrated in FIG. 1 are driven according to the hydraulic oil supplied from the proportional control valve 37. This causes the work machine 2 to be operated.

<Display System 28>

The display system 28 is a system for providing an operator with information for forming a shape like a design surface described later by excavating the ground within a work area. In addition to the first stroke sensor 16, the second stroke sensor 17, the third stroke sensor 18, the three-dimensional position sensor 23, and the inclination angle sensor 24 described above, the display system 28 includes the display input device 38 as a display device, the display control device 39, and a sound generating device 46 including, for example, a speaker to emit an alarm sound.

The display input device 38 includes a touch panel-type input unit 41, and a display unit 42 such as a liquid crystal display (LCD). The display input device 38 displays a guidance screen for providing information for excavating. A variety of keys are displayed on the guidance screen. An operator (a service person in a case of checking or repairing the excavator 100) can execute a variety of functions of the display system 28 by touching the variety of keys on the guidance screen. The guidance screen will be described later in detail.

The display control device 39 executes the variety of functions of the display system 28. The display control device 39 is an electronic control device including a storage unit 43 including a RAM and/or a ROM, and a processing unit 44 such as a CPU. The storage unit 43 stores work machine data. The work machine data includes the length L1 of the boom 6, the length L2 of the arm 7, and the length L3 of the bucket 8 described above. The work machine data also includes a minimum value and a maximum value of each of the inclination angle θ1 of the boom 6, the inclination angle θ2 of the arm 7, and the inclination angle θ3 of the bucket 8.

The display control device 39 and the work machine electronic control device 26 can communicate with each other via a wireless or wired communication means. The storage unit 43 of the display control device 39 stores design land shape data created in advance. The design land shape data is information on the shape and position of a three-dimensional design land shape. The design land shape indicates a target shape of the ground as a work object. The display control device 39 causes the display input device 38 to display a guidance screen based on information such as the design land shape data and the detection results from the variety of sensors described above. Specifically, as illustrated in FIG. 5, the design land shape includes a plurality of design surfaces 45, each of which is expressed by a triangular polygon. In FIG. 5, the reference sign 45 is given to only one of the plurality of design surfaces, while reference signs for the other design surfaces are omitted. One or more design surfaces of the design surfaces 45 are used as a target work object (target work objects). An operator selects one or more design surfaces of the design surfaces 45 as a target surface (target surfaces). The design surface 70 is a surface which will be excavated as a target surface among the plurality of design surfaces 45. The display control device 39 causes the display input device 38 to display a guidance screen to inform an operator of the position of the design surface 70.

<Guidance Screen>

Figure 6:
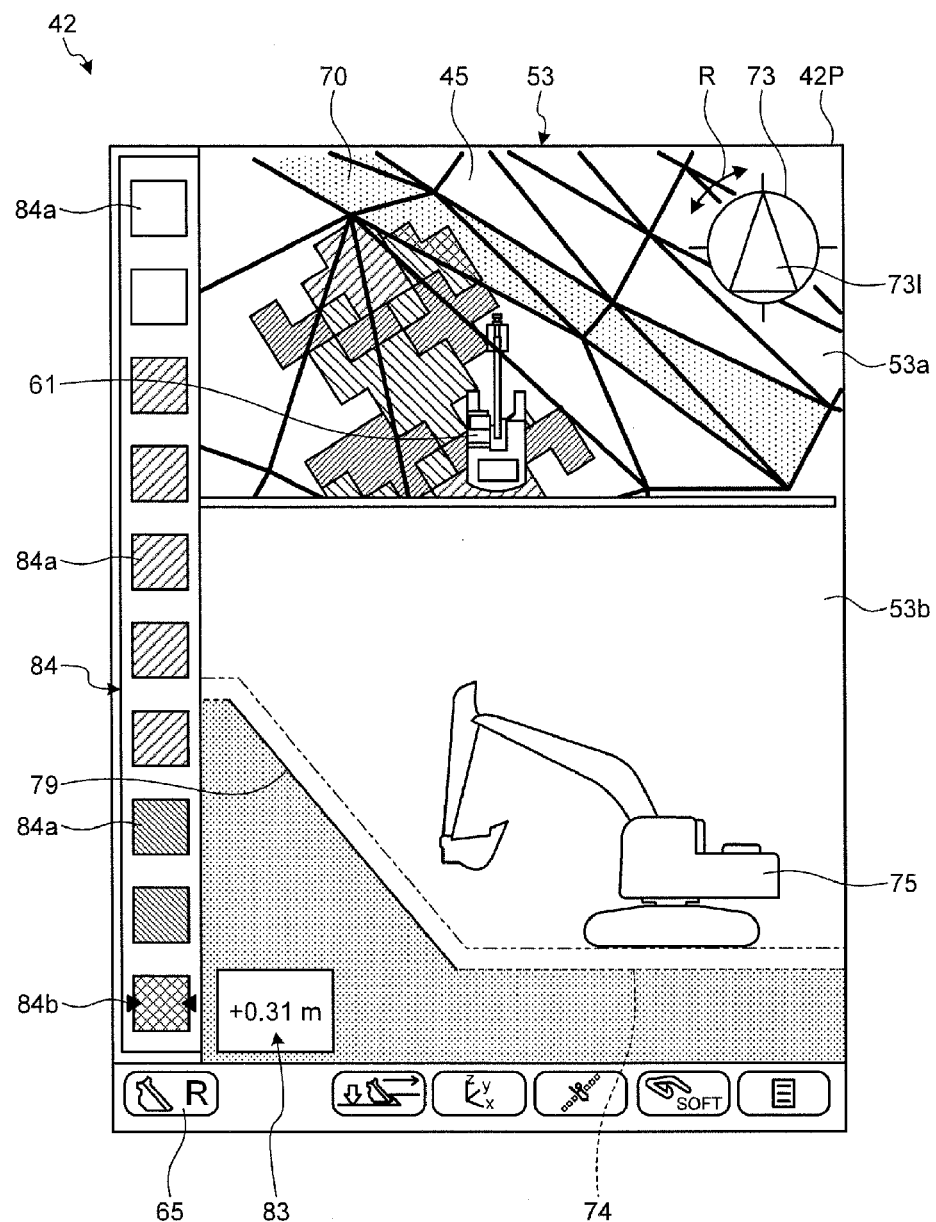
FIG. 6 is a view illustrating an example of a guidance screen.
Figure 7:
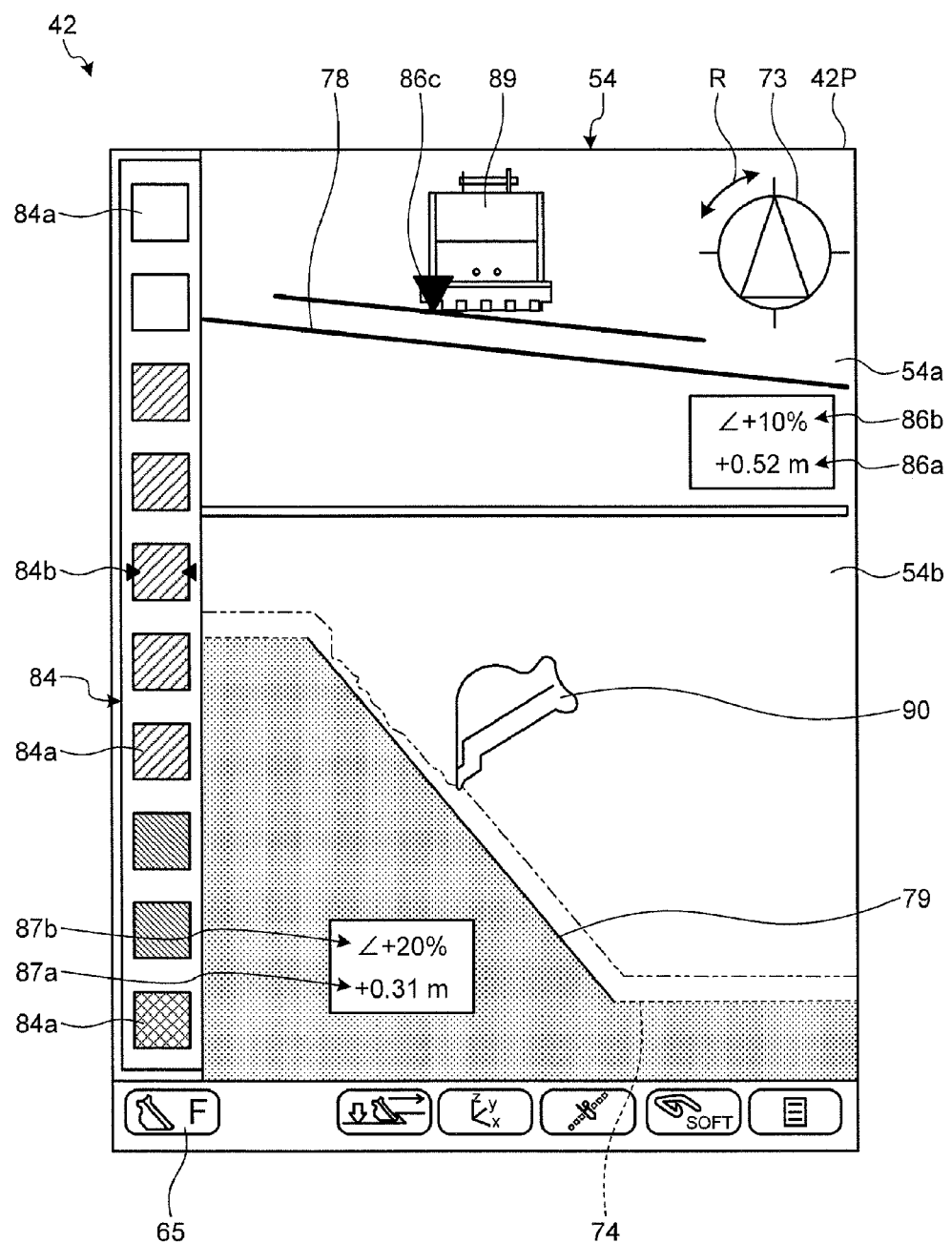
FIG. 7 is a view illustrating an example of the guidance screen.

FIGS. 6 and 7 are views illustrating examples of the guidance screen. The guidance screen indicates a positional relation between the design surface 70 and the blade tip P3 of the bucket 8. The guidance screen is a screen to guide the work machine 2 of the excavator 100 such that the ground as a work object has the same shape as the design surface 70. As illustrated in FIGS. 6 and 7, the guidance screen includes a guidance screen in a coarse excavation mode (hereinafter, appropriately referred to as a coarse excavation screen 53) and a guidance screen in a fine excavation mode (hereinafter, appropriately referred to as a fine excavation screen 54).

(Coarse Excavation Screen 53)

The coarse excavation screen 53 illustrated in FIG. 6 is displayed on a screen 42P of the display unit 42. The coarse excavation screen 53 includes a top view 53*a* indicating a design land shape of a work area and the current position of the excavator 100, and a side view 53*b* indicating a positional relation between the design surface 70 and the excavator 100. The top view 53*a* of the coarse excavation screen 53 indicates a design land shape expressed by a plurality of triangular polygons in a top view. More specifically, the top view 53*a* indicates the design land shape, while a swing plane on which the excavator 100 swings is used as a projection surface. Therefore, the top view 53*a* is a bird's eye view when the excavator 100 is viewed from right above. When the excavator 100 is inclined, the design surfaces are also inclined.

The design surface 70 selected from the plurality of design surfaces 45 as the target work object is displayed in a different color from the other design surfaces 45. In FIG. 6, the current position of the excavator 100 is indicated by an icon 61 of the excavator 100 in the top view, but may be indicated by another symbol. The top view 53*a* includes information for bringing the excavator 100 face-to-face with the design surface 70. The information for bringing the excavator 100 face-to-face with the design surface 70 is displayed as a target surface facing compass 73. The target surface facing compass 73 is, for example, an icon indicating a direction directly facing the design surface 70 and a direction in which the excavator 100 should swing, by rotation of an indicator 731 having an arrow shape in an arrow R direction. An operator of the excavator 100 can check a facing degree to the design surface 70 using the target surface facing compass 73.

The side view 53*b* of the coarse excavation screen 53 includes an image indicating a positional relation between the design surface 70 and the blade tip P3 of the bucket 8, and distance information indicating a distance between the design surface 70 and the blade tip P3 of the bucket 8. Specifically, the side view 53*b* includes a line 74 indicating a cross section of a design surface, a line 79 indicating a cross section of a design surface, and an icon 75 of the excavator 100 in the side view. The line 74 indicating a cross section of a design surface indicates a cross section of one of the design surfaces 45, other than the design surface 70.

The line 79 indicating a cross section of a design surface indicates a cross section of the design surface 70. As illustrated in FIG. 5, the line 74 indicating a cross section of the design surface and the line 79 indicating a cross section of the design surface are obtained by calculating an intersection 80 between a plane 77 passing through the current position of the blade tip P3 of the bucket 8 and the design surface 45. The processing unit 44 of the display control device 39 determines the intersection 80. A method for determining the current position of the blade tip P3 of the bucket 8 will be described later.

In the side view 53b, the line 79 indicating a cross section of the design surface is displayed in a different color from the line 74 indicating a cross section of the design surface. In FIG. 6, the line 79 indicating a cross section of the design surface and the line 74 indicating a cross section of the design surface are displayed with different types of lines from each other. In the side view 53b, an area on the underground side of the line 79 indicating a cross section of the design surface and the line 74 indicating a cross section of the design surface is displayed in a different color from an area on the air side of these lines. In FIG. 6, the area on the underground side of the line 79 indicating a cross section of the design surface and the line 74 indicating a cross section of the design surface is hatched to express a difference in color.

The distance information indicating the distance between the design surface 70 and the blade tip P3 of the bucket 8 includes numerical information 83 and graphic information 84. The numerical information 83 indicates a numerical value of the shortest distance between the design surface 70 and the blade tip P3 of the bucket 8. The graphic information 84 indicates the distance between the design surface 70 and the blade tip P3 of the bucket 8 by graphics. The graphic information 84 is an index for guidance to indicate the position of the blade tip P3 of the bucket 8. Specifically, the graphic information 84 includes index bars 84a and an index mark 84b indicating a position where the distance between the design surface 70 and the blade tip P3 of the bucket 8 is zero, among the index bars 84a. Each of the index bars 84a is lit in accordance with the shortest distance between the design surface 70 and the blade tip P3 of the bucket 8. On/off in displaying the graphic information 84 may be changeable by an operation of the input unit 41 by an operator of the excavator 100.

As described above, the coarse excavation screen 53 displays a relative positional relation between the line 79 indicating a cross section of the design surface and the excavator 100 and numerical values indicating the shortest distance between the blade tip P3 of the bucket 8 and the line 79 indicating a cross section of the design surface. An operator of the excavator 100 can easily excavate by moving the blade tip P3 of the bucket 8 along the line 79 indicating a cross section of the design surface such that the current land shape becomes a design land shape. On the coarse excavation screen 53, a screen switch key 65 for switching the guidance screen is displayed. The operator can switch from the coarse excavation screen 53 to the fine excavation screen 54 by operating the screen switch key 65.

(Fine Excavation Screen 54)

The fine excavation screen 54 illustrated in FIG. 7 is displayed on the screen 42P of the display unit 42. The fine excavation screen 54 indicates a positional relation between the design surface 70 and the excavator 100 in more detail than the coarse excavation screen 53. That is, the fine excavation screen 54 indicates a positional relation between the design surface 70 and the blade tip P3 of the bucket 8 in more detail than the coarse excavation screen 53. The fine excavation screen 54 includes a front view 54a indicating the design surface 70 and the bucket 8, and a side view 54b indicating the design surface 70 and the bucket 8. The front view 54a of the fine excavation screen 54 includes an icon 89 indicating the bucket 8 in a front view and a line 78 indicating a cross section of the design surface 70 in the front view. The front (front view) means viewing the bucket 8 illustrated in FIGS. 1 and 2 from the side of the main vehicle body 1, and viewing the bucket 8 in parallel with the Ya axis in the main vehicle body coordinate system described later.

The side view 54b of the fine excavation screen 54 includes an icon 90 indicating the bucket 8 in the side view, the line 74 indicating a cross section of the design surface, and the line 79 indicating a cross section of the design surface. Each of the front view 54a and the side view 54b of the fine excavation screen 54 displays information indicating a positional relation between the design surface 70 and the bucket 8. The side (side view) means viewing from an extending direction (a direction of the swing center axis of the bucket 8) of the bucket pin 15 illustrated in FIGS. 1 and 2, and viewing in parallel with the Xa axis in the main vehicle body coordinate system described later.

In the front view 54a, the information indicating the positional relation between the design surface 70 and the bucket 8 includes distance information 86a and angle information 86b. The distance information 86a indicates a distance between the blade tip P3 of the bucket 8 and the design surface 70 in the Za direction. This distance is a distance between the design surface 70 and the position of the blade tip P3 of the bucket 8 closest to the design surface 70 in the width direction. In the front view 54a, a mark 86c indicating the closest position is displayed while the mark 86c is overlapped on the icon 89 in the front view of the bucket 8. The angle information 86b indicates an angle between the design surface 70 and the bucket 8. Specifically, the angle information 86b indicates an angle between a virtual segment passing through the blade tip P3 of the bucket 8 and the line 78 indicating a cross section of the design surface.

In the side view 54b, the information indicating the positional relation between the design surface 70 and the bucket 8 includes distance information 87a and angle information 87b. The distance information 87a indicates the shortest distance between the bucket 8 and the design surface 70, i.e., a distance between the bucket 8 and the design surface 70 in a normal direction of the design surface 70 (for example, a distance between the blade tip P3 of the bucket 8 and the design surface 70). The angle information 87b indicates an angle between the design surface 70 and the bucket 8. Specifically, the angle information 87b displayed in the side view 54b indicates an angle between a bottom surface of the bucket 8 and the line 79 indicating a cross section of the design surface.

The fine excavation screen 54 includes the above-described graphic information 84 indicating the distance between the blade tip P3 of the bucket 8 and the design surface 70 by graphics. The graphic information 84 includes the index bars 84a and the index mark 84b like the graphic information 84 of the coarse excavation screen 53. As described above, the fine excavation screen 54 displays in detail a relative positional relation between each of the lines 78 and 79 indicating a cross section of the design surface and the blade tip P3 of the bucket 8. An operator of the excavator 100 can more easily excavate by moving the blade tip P3 of the bucket 8 along the lines 78 and 79 each indicating a cross section of the design surface such that the current land shape becomes the same shape as a three-dimensional design land shape. On the fine excavation screen 54, the screen switch key 65 is displayed like on the coarse excavation screen 53. The operator can switch from the fine excavation screen 54 to the coarse excavation screen 53 by operating the screen switch key 65.

<Method for Determining Current Position of Blade Tip P3 of Bucket 8>

The line 79 indicating a cross section of the design surface is calculated from the current position of the blade tip P3 of the bucket 8. The display control device 39 determines the current position of the blade tip P3 of the bucket 8 in a global coordinate system {X, Y, Z} based on the detection results of the three-dimensional position sensor 23, the first to third stroke sensors 16 to 18, the inclination angle sensor 24, and the like. In the present embodiment, the current position of the blade tip P3 of the bucket 8 is determined as follows.

Figure 8:
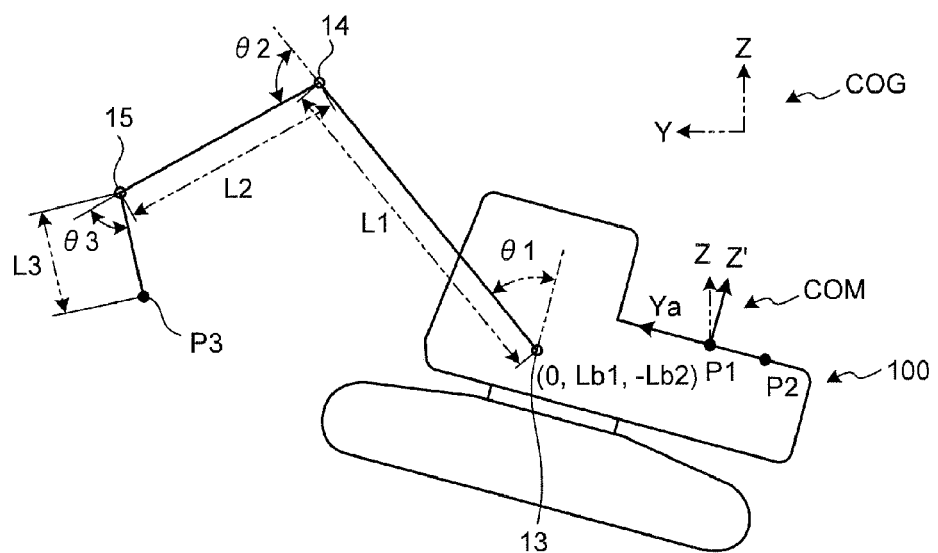
FIG. 8 is a view for describing an example of a method for determining a current position of a blade tip P3 of a bucket 8.
Figure 9:
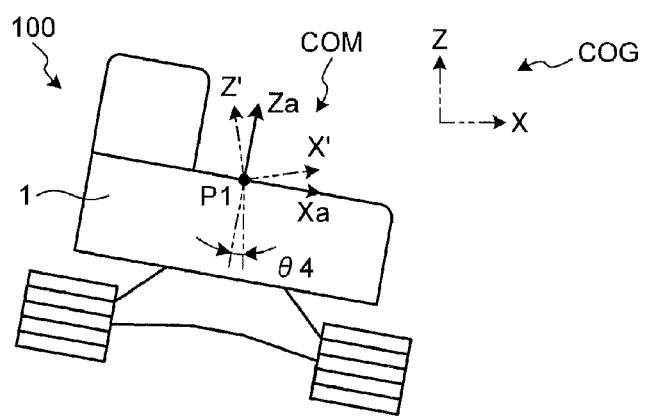
FIG. 9 is a view for describing an example of the method for determining the current position of the blade tip P3 of the bucket 8.

FIGS. 8 and 9 are views for describing an example of the method for determining the current position of the blade tip P3 of the bucket 8. FIG. 8 is a side view of the excavator 100. FIG. 9 is a back view of the excavator 100. To determine the current position of the blade tip P3 of the bucket 8, as illustrated in FIG. 8, the display control device 39 determines a main vehicle body coordinate system {Xa, Ya, Za} in which the setting position P1 of the GNSS antenna 21 described above is the origin. In the present example, it is assumed that the front-back direction of the excavator 100, i.e., the Ya axis direction in the coordinate system of the main vehicle body 1 (main vehicle body coordinate system) COM, is inclined with respect to the Y axis direction in the global coordinate system COG. The coordinates of the boom pin 13 in the main vehicle body coordinate system COM are (0, Lb1, −Lb2), and stored in the storage unit 43 of the display control device 39 in advance.

The three-dimensional position sensor 23 illustrated in FIGS. 2 and 4 detects the setting positions P1 and P2 of the GNSS antennas 21 and 22. A unit vector in the Ya axis direction is calculated from the coordinate positions of the detected setting positions P1 and P2 according to formula (1).

$$Ya=(P1-P2)/|P1-P2| \quad (1)$$

As illustrated in FIG. 8, when a vector Z′ which passes through a plane expressed by the two vectors Ya and Z and is perpendicular to Ya is introduced, formulae (2) and (3) are obtained. In formula (3), c is a constant. From formulae (2) and (3), Z′ is expressed by formula (4). When X′ is defined as a vector perpendicular to Ya and Z′, X′ is expressed by formula (5).

$$(Z', Ya)=0 \quad (2)$$

$$Z'=(1-c)\times Z+c\times Ya \quad (3)$$

$$Z'=Z+\{(Z,Ya)/((Z,Ya)-1)\}\times (Ya-Z) \quad (4)$$

$$X'=Ya\perp Z' \quad (5)$$

As illustrated in FIG. 9, the main vehicle body coordinate system COM is obtained by turning the coordinate system expressed in formula (5) around the Ya axis at the above-described roll angle θ4, and is thus expressed by formula (6).

$$[Xa \ Ya \ Za]=[X' \ Ya \ Z']\begin{bmatrix} \cos\theta 4 & 0 & \sin\theta 4 \\ 0 & 1 & 0 \\ -\sin\theta 4 & 0 & \cos\theta 4 \end{bmatrix} \quad (6)$$

The current inclination angles θ1, θ2, and θ3 of the boom 6, the arm 7, and the bucket 8 described above are calculated from the detection results of the first to third stroke sensors 16 to 18, respectively. The coordinates (xat, yat, zat) of the blade tip P3 of the bucket 8 in the main vehicle body coordinate system COM can be determined according to formulae (7) to (9) using the inclination angles θ1, θ2, and θ3, and the length L1 of the boom 6, the length L2 of the arm 7, and the length L3 of the bucket 8. It is assumed that the blade tip P3 of the bucket 8 moves in the Ya−Za plane in the main vehicle body coordinate system COM. The coordinates of the blade tip P3 of the bucket 8 in the global coordinate system COG can be determined according to formula (10). The coordinates of the blade tip P3 in the global coordinate system COG indicate the position of the blade tip P3.

$$xat=0 \quad (7)$$

$$yat=Lb1+L1\times\sin\theta 1+L2\times\sin(\theta 1+\theta 2)+L3\times\sin(\theta 1+\theta 2+\theta 3) \quad (8)$$

$$zat=-Lb2+L1\times\cos\theta 1+L2\times\cos(\theta 1+\theta 2)+L3\times\cos(\theta 1+\theta 2+\theta 3) \quad (9)$$

$$P3=xat\cdot Xa+yat\cdot Ya+zat\cdot Za+P1 \quad (10)$$

As illustrated in FIG. 5, the display control device 39 calculates, based on the current position of the blade tip P3 of the bucket 8 calculated as described above and the design land shape data stored in the storage unit 43, the intersection 80 between the three-dimensional design land shape and the Ya−Za plane 77 passing through the blade tip P3 of the bucket 8. The display control device 39 displays a part of the intersection 80 passing through the design surface 70 on the guidance screen as the line 79 indicating a cross section of the design surface described above. Next, an example in which the display control device 39 illustrated in FIG. 4 displays, on the screen 42P of the display unit 42 of the display input device 38, a path of movement of the blade tip P3 when the bucket 8 excavates the ground as a work object will be described.

<Calculation of Shortest Distance to Design Surface>

Figure 10:
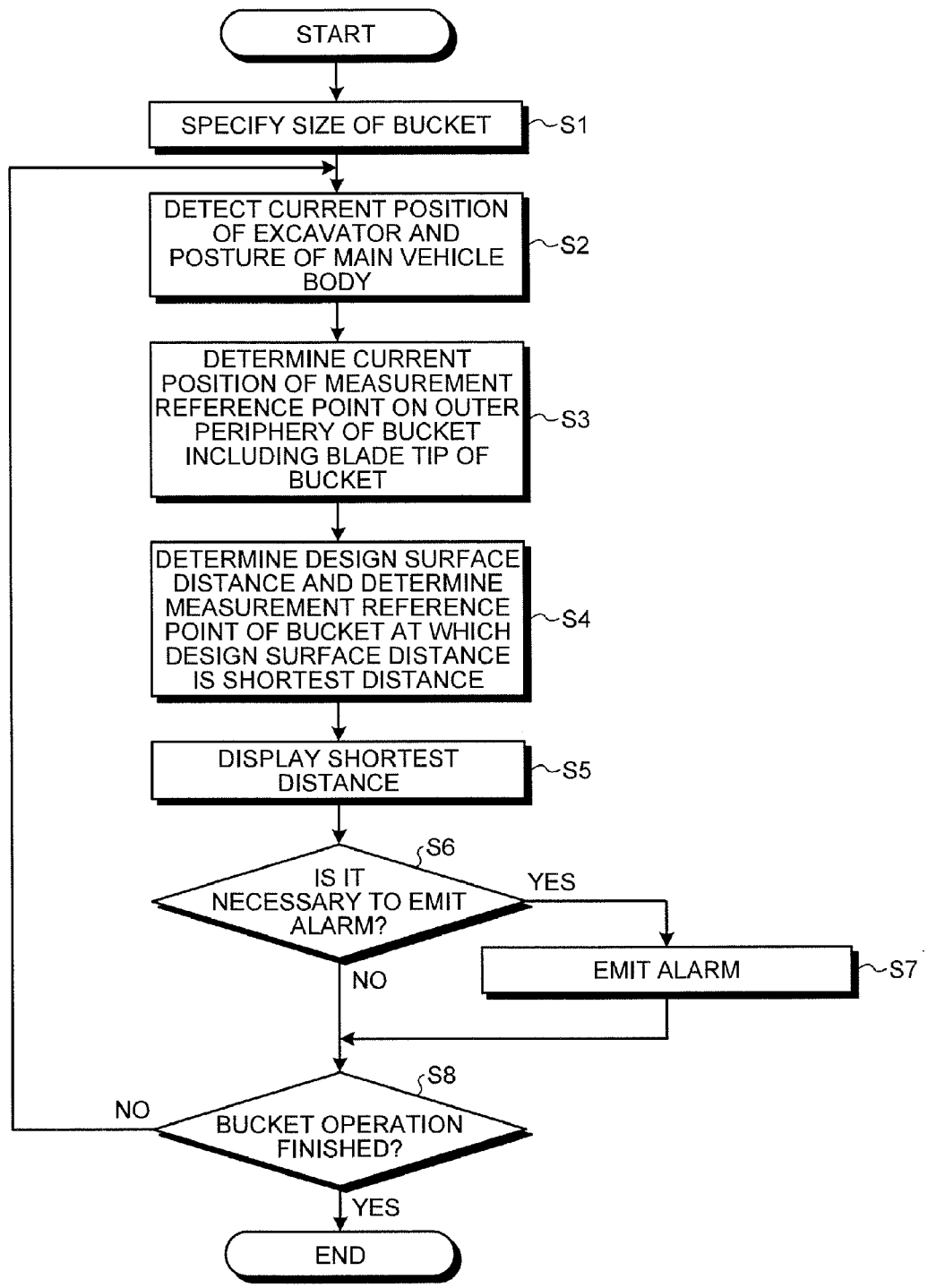
FIG. 10 is a flowchart illustrating an example of determining the shortest distance between the bucket 8 and a design surface.

FIG. 10 is a flowchart illustrating an example of determining the shortest distance between the bucket 8 and a design surface. In order to display the bucket 8 on the screen 42P of the display unit 42 illustrated in FIG. 4, in Step S1, the display control device 39, more specifically, the processing unit 44 measures the size of the bucket. In the work machine 2, the bucket 8 is detachable from the arm 7, and the bucket 8 can be replaced with another bucket to be attached to the arm 7. The storage unit 43 of the display control device 39 illustrated in FIG. 4 stores bucket outer shape information input from the input unit 41 and specifying the size of the bucket 8.

Figures 11, 12:
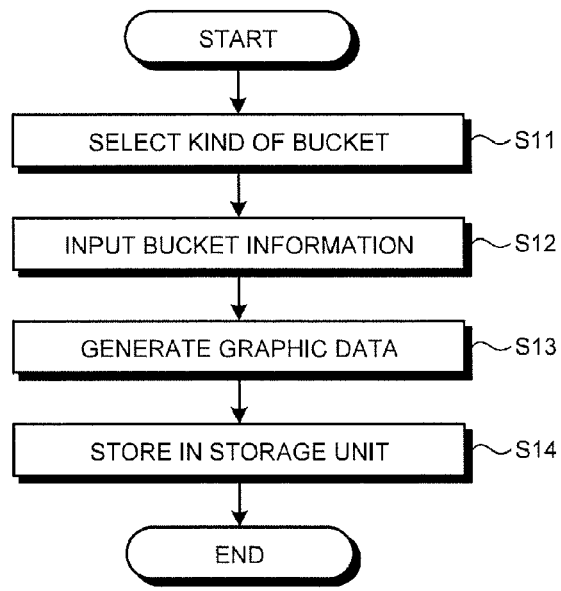
FIG. 11 is a flowchart illustrating a procedure for storing outer shape information of the bucket 8.
FIG. 12 is a diagram illustrating an example of the outer shape information of the bucket 8.
Figure 13:
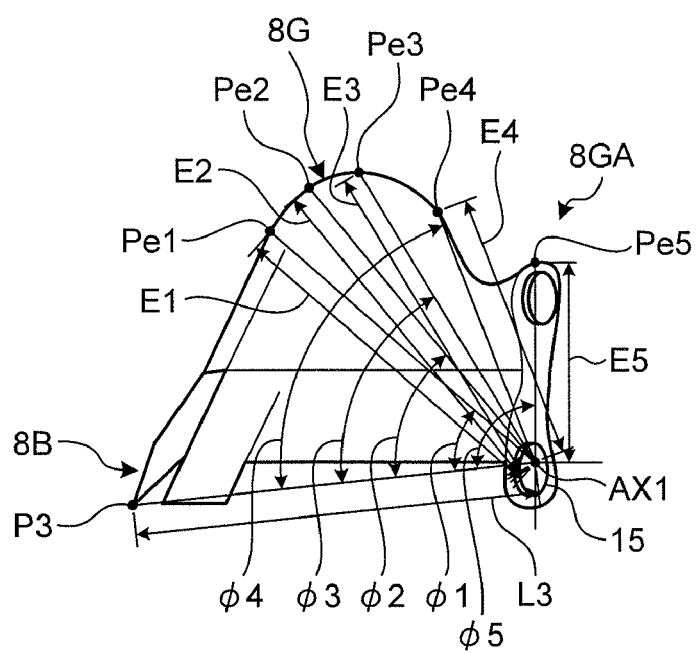
FIG. 13 is a diagram illustrating a graphic example of the outer shape information of the bucket 8.

Here, procedures of storing the bucket outer shape information in the storage unit 43 will be described with reference to FIGS. 11 to 13. FIG. 11 is a flowchart illustrating a procedure of storing the outer shape information of the bucket 8. FIG. 12 is a diagram illustrating an example of the outer shape information of the bucket 8. FIG. 13 is a diagram illustrating a graphic example of the outer shape information of the bucket 8. As illustrated in FIG. 11, the input unit 41 of the display input device 38 waits for input. As illustrated in Step S11, the display input device 38 receives a selected kind of bucket. The processing unit 44 stores, in the storage unit 43, information of the selected kind of bucket received by the display input device 38.

For example, the processing unit 44 stores a kind identification code 1 as a standard bucket like the above-described bucket 8 in association with a registration identification code illustrated in FIG. 12. The processing unit 44 stores a kind identification code 2 as a tilt bucket described later in association with the registration identification code. Subsequently, in Step S12 illustrated in FIG. 11, the display input device 38 receives bucket information, and the processing unit 44 stores, in the storage unit 43, the bucket information input to the display input device 38. This bucket information includes, for example, information having the buttock parts A to E of the bucket 8 as measurement reference points, in addition to the bucket width, the bucket length, the bucket recess depth, the bucket height of the bucket 8, and the like. As illustrated in FIG. 13, a plurality of measurement reference points Pen (n is a natural number, for example, n=1, 2, 3, 4, 5) are fixed in advance at different points along the outer shape of the buttock part 8C of the bucket 8. As illustrated in FIG. 12, the bucket information includes, as each length of the buttock parts A to E of the bucket 8, a length between a turning center axis AX1 and the measurement reference point Pen, when viewed from the extending direction of the bucket pin 15 (direction of the turning center axis AX1 of the bucket 8) illustrated in FIGS. 1 and 2. The bucket information also includes, as each angle of the buttock parts A to E of the bucket 8, an angle between a straight line connecting the turning center axis AX1 and the measurement reference point Pen and a straight line connecting the turning center axis AX1 and the blade tip P3 of the bucket 8, when viewed from the extending direction of the bucket pin 15.

Subsequently, in Step S13, the processing unit 44 calculates and generates a shape of the graphic data 8GA of an icon of the bucket 8, illustrated in FIG. 13, for example, based on the outer shape information of the bucket illustrated in FIG. 12. The graphic data 8GA of the icon is information indicating a shape satisfying the outer shape information of the bucket illustrated in FIG. 12 by graphics. Subsequently, in Step S14, the processing unit 44 stores, in the storage unit 43, the graphic data 8GA of the icon of the bucket 8 generated in Step S13. As described above, in Step S1, the processing unit 44 then reads the bucket information and the graphic data 8GA of the icon stored in the storage unit 43 based on the input of the input unit 41 to specify the size of the bucket.

Subsequently, in Step S2 illustrated in FIG. 10, the processing unit 44 detects the current position of the excavator 100 and the posture of the main vehicle body 1. The display control device 39 detects a current position of the main vehicle body 1 based on the detection signal from the three-dimensional position sensor 23. As described above, in the main vehicle body coordinate system COM, in the work machine 2 of the excavator 100, the boom 6, the arm 7, and the bucket 8 are driven along the Ya–Za plane by the boom cylinder 10, the arm cylinder 11, and the bucket cylinder 12. When the boom cylinder 10, the arm cylinder 11, and the bucket cylinder 12 are driven, the arm 7 moves along the Ya–Za plane determined in accordance with the posture (inclination) of the main vehicle body 1 in the main vehicle body coordinate system COM so that the bucket 8 moves. The processing unit 44 then detects the posture state of the work machine 2 based on the detection results of the three-dimensional position sensor 23, the first to third stroke sensors 16 to 18, the inclination angle sensor 24, and the like.

Subsequently, in Step S3, the processing unit 44 determines a current position of the measurement reference point Pen on the outer periphery of the bucket 8 including the blade tip P3 of the bucket 8. The display control device 39 can determine the current position of the blade tip of the bucket 8 calculated according to formula (10) described above. Using the above-described current inclination angles θ1, θ2, and θ3 of the boom 6, the arm 7, and the bucket 8, the coordinates (xaen, yaen, zaen) of the measurement reference point Pen (for example, n=1, 2, 3, 4, 5) of the bucket 8 in the main vehicle body coordinate system COM can be determined using the inclination angles θ1, θ2, and θ3, the length L1 of the boom 6, the length L2 of the arm 7, the length L3 of the bucket 8, and bucket information (length: En, angle: φn, n is a natural number, for example, n=1, 2, 3, 4, 5) according to formulae (11) to (13). It is assumed that the measurement reference point Pen of the bucket 8 moves in the Ya–Za plane in the main vehicle body coordinate system COM. The coordinates of the blade tip P3 of the bucket 8 in the global coordinate system COG can be determined according to formula (14). Each set of coordinates of the measurement reference point Pen in the global coordinate system COG indicates a position of the measurement reference point Pen of the bucket 8.

$$xaen = 0 \tag{11}$$

$$yaen = Lb1 + L1 \times \sin\theta1 + L2 \times \sin(\theta1+\theta2) + En \times \sin(\theta1+\theta2+\theta3-\phi n) \tag{12}$$

$$zaen = -Lb2 + L1 \times \cos\theta1 + L2 \times \cos(\theta1+\theta2) + En \times \cos(\theta1+\theta2+\theta3-\phi n) \tag{13}$$

$$Pen = xaen \cdot Xa + yaen \cdot Ya + zaen \cdot Za + P1 \tag{14}$$

As illustrated in FIG. 5, the display control device 39 calculates, based on the current position of the measurement reference point Pen of the bucket 8 calculated as described above and the design land shape data stored in the storage unit 43, the intersection 80 between the three-dimensional design land shape and the Ya–Za plane 77 passing through the measurement reference point Pen of the bucket 8. The display control device 39 displays the part of the intersection 80 passing through the design surface 70 on the guidance screen as the line 79 indicating a cross section of the design surface and the line 74 indicating a cross section of the design surface described above.

Subsequently, in Step S4, the processing unit 44 determines a distance between the bucket 8 and the design surface (design surface distance) to determine the measurement reference point Pen or the blade tip P3 of the bucket 8, at which the design surface distance is the shortest among the measurement reference points Pen of the bucket 8 including the blade tip P3.

Figure 14:
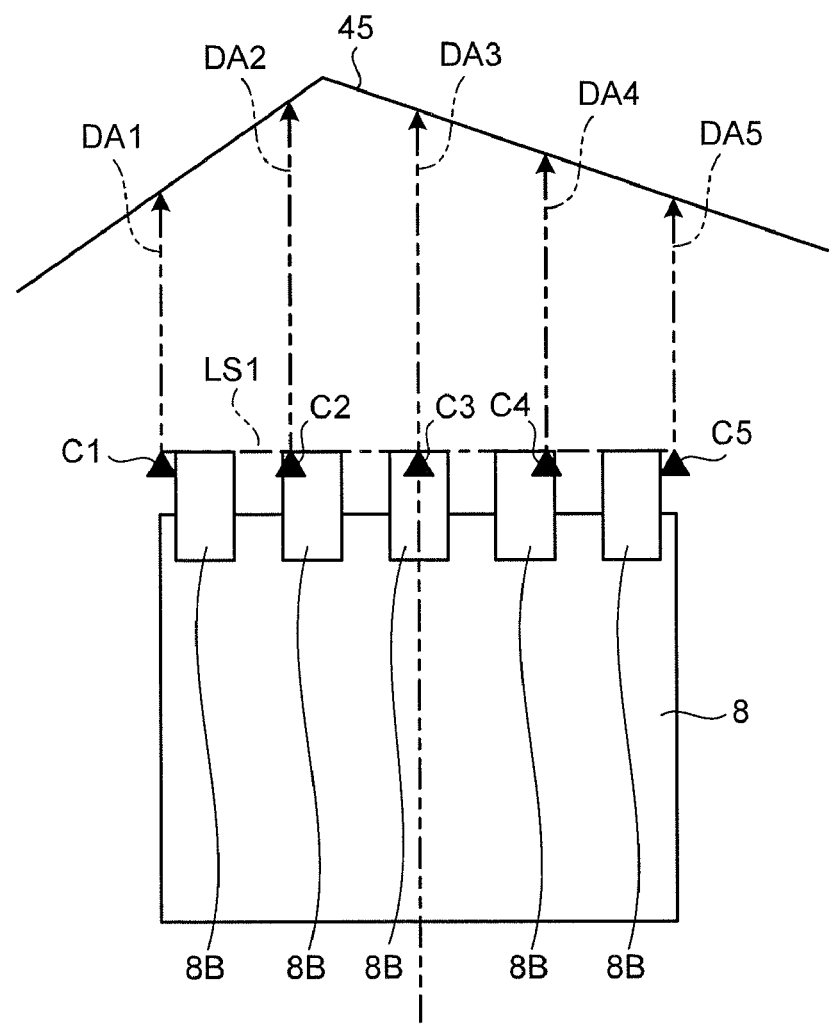
FIG. 14 is a diagram for describing the shortest distance between a design surface 45 and the blade tip P3 of the bucket 8 when the blade tip P3 of the bucket 8 is viewed from above.

In this case, the processing unit 44 can further enhance the accuracy of the distance between the bucket 8 and the design surface when taking a plurality of measurement reference points in the width direction of the bucket 8 (a direction parallel to the Xa axis) into consideration. FIG. 14 is a diagram for describing the shortest distance between a design surface 45 and the blade tip P3 of the bucket 8 when the outer shape of the bucket 8 is viewed from above. As illustrated in FIG. 14, the processing unit 44 calculates a virtual segment LS1 passing through tips of a plurality of blades 8B of the bucket 8 and having a size of the bucket 8 in the width direction. Note that the processing unit 44 calculates the virtual segment LS1 by reading the size of the bucket 8 in the width direction from the bucket outer shape information specified in Step S1.

For example, the processing unit 44 equally divides the virtual segment LS1 into a plurality of regions (for example, four regions). Five points representing boundaries and both ends of the regions are referred to as $C_i$, which are set as a first measurement reference point C1, a second measurement reference point C2, a third measurement reference point C3, a fourth measurement reference point C4, and a fifth measurement reference point C5. The division number i is a natural number, and 1, 2, 3, 4, or 5 in the present example. That is, the first measurement reference point C1, the second measurement reference point C2, the third measurement reference point C3, the fourth measurement reference point C4, and the fifth measurement reference point C5 indicate a plurality of specified positions of the blade tip P3 of the bucket 8 in the width direction. The processing unit 44 calculates current positions of the first measurement reference point C1, the second measurement reference point C2, the third measurement reference point C3, the fourth measurement reference point C4, and the fifth measurement reference point C5 based on the current position of the excavator 100 detected in Step S2. Specifically, the processing unit 44 calculates the current position of the third measurement reference point C3 in the middle by the above-described method for calculating the current position of the blade tip P3 of the bucket 8. The processing unit 44 then calculates the current positions of the first measurement reference point C1, the second measurement reference point C2, the fourth measurement reference point C4, and the fifth measurement reference point C5 using the current position of the third measurement reference point C3 in the middle, the size of the bucket 8 in the width direction, and the extending direction of the virtual segment LS1.

Figure 15:
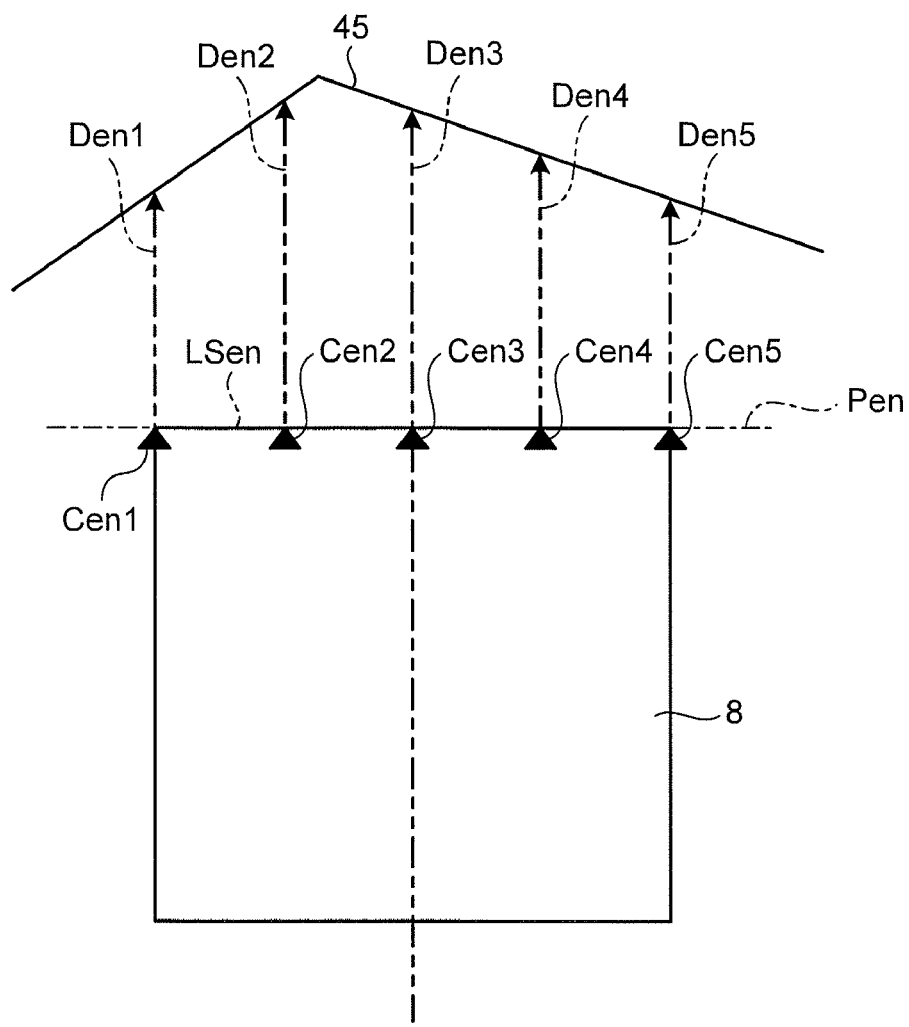
FIG. 15 is a diagram for describing the shortest distance between the design surface 45 and a buttock part 8C of the bucket 8 when the outer shape of the bucket 8 is viewed from above.

FIG. 15 is a diagram for describing the shortest distance between the design surface 45 and the buttock part 8C of the bucket 8 when the external shape of the bucket 8 is viewed from above. As illustrated in FIG. 15, the processing unit 44 calculates a virtual segment LSen passing through the measurement reference point Pen of the bucket 8 and having a size of the bucket 8 in the width direction. Note that the processing unit 44 calculates the virtual segment LSen by reading the size of the bucket 8 in the width direction from the bucket outer shape information specified in Step S1.

For example, the processing unit 44 equally divides the virtual segment LSen into a plurality of regions (for example, four regions). Five points representing boundaries and both ends of the regions are referred to as Ceni, which are set as a first measurement reference point Cen1, a second measurement reference point Cen2, a third measurement reference point Cen3, a fourth measurement reference point Cen4, and a fifth measurement reference point Cen5. The division number i is a natural number, and the same as the above-described i value. Therefore, this case is easily compared with the case of the blade tip P3. That is, the first measurement reference point Cen1, the second measurement reference point Cen2, the third measurement reference point Cen3, the fourth measurement reference point Cen4, and the fifth measurement reference point Cen5 indicate a plurality of specified positions of the measurement reference point Pen of the bucket 8 in the width direction. The processing unit 44 then calculates the current positions of the first measurement reference point Cen1, the second measurement reference point Cen2, the third measurement reference point Cen3, the fourth measurement reference point Cen4, and the fifth measurement reference point Cen5 based on the information on the current position of the measurement reference point Pen of the bucket 8 detected in Step S3. Specifically, the processing unit 44 calculates the current position of the third measurement reference point Cen3 in the middle. The processing unit 44 then calculates the current positions of the first measurement reference point Cen1, the second measurement reference point Cen𝑖, the fourth measurement reference point Cen4, and the fifth measurement reference point Cen5 using the current position of the third measurement reference point Cen3 in the middle, the size of the bucket 8 in the width direction, and the extending direction of the virtual segment LSen. As described above, the plurality of measurement reference points is fixed in advance along a cross section obtained by cutting the outer shape of the bucket 8 with a plane parallel to a moving direction of the bucket 8, i.e., a plane parallel to the above-described Ya–Za plane and the width direction of the bucket 8.

Figure 16:
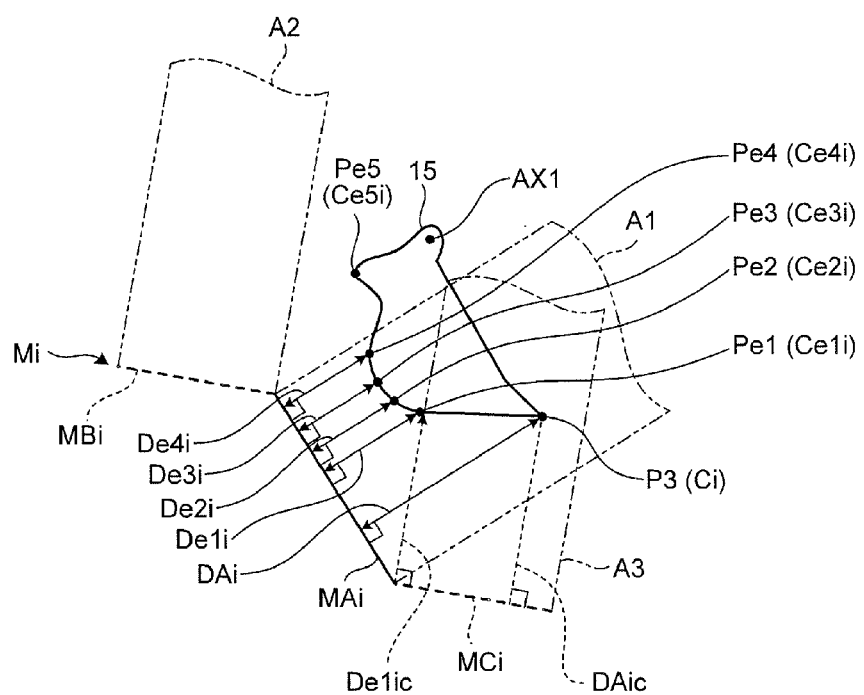
FIG. 16 is a diagram for describing the shortest distance between the design surface 45 and the bucket 8 when the bucket 8 is viewed from the side.

FIG. 16 is a diagram for describing the shortest distance between the design surface 45 and the bucket 8 when the bucket 8 is viewed from the side. When an intersection between the design surface 45 and the Ya–Za plane passing through the i-th measurement reference point Ci, Ceni is referred to as Mi, in Step S4, the processing unit 44 calculates a distance between each of the intersections MAi, MBi, and MCi included in the intersection Mi and the i-th measurement reference point Ci, Ceni. Here, a perpendicular line of each of the intersections MAi, MBi, and MCi included in the intersection Mi, passing through the i-th measurement reference point Ci, Ceni, is calculated, and the distance between each of the intersections MAi, MBi, and MCi and the i-th measurement reference point Ci, Ceni is calculated. For example, as illustrated in FIGS. 14 to 16, the perpendicular line of the intersection MAi, passing through the i-th measurement reference point Ci located in a target region A1 among the target regions A1 to A3, is calculated, and a design surface distance DAi, Deni between the i-th measurement reference point Ci, Ceni and the intersection MAi is calculated. As illustrated in FIGS. 14 to 16, the perpendicular line of the intersection MCi, passing through the i-th measurement reference point Ci, Ceni located in a target region A3 among the target regions A1 to A3, is calculated, and a design surface distance DAic, Denic between the i-th measurement reference point Ci, Ceni, and the intersection MCi is calculated. In this way, the processing unit 44 determines the shortest distance as a minimum distance from the calculable distances illustrated in FIGS. 14 to 16. When the same measurement reference point Pe1 and the same blade tip P3 exist in a plurality of normal directions of the intersections MAi and MCi, the processing unit 44 determines a plurality of design surface distances De1$i$, DAi for the measurement reference point Pe1 and the blade tip P3. As a result, the shortest distance as a minimum distance can be determined taking the plurality of design surfaces into consideration. Therefore, the bucket 8 can be moved based on one of the design surfaces (intersection MAi) to avoid unintentional collision between the bucket 8 and the other design surface (intersection MCi).

Subsequently, in Step S5, the processing unit 44 displays information corresponding to the shortest distance determined in Step S4 as the numerical information 83 illustrated in FIG. 6 or the distance information 87$a$ illustrated in FIG. 7, described above. The processing unit 44 displays an image SD1 or SD2 described later as a graphic display. The processing unit 44 may display information corresponding to the shortest distance determined in Step S4 by lighting the index bar 84$a$.

Figure 17:
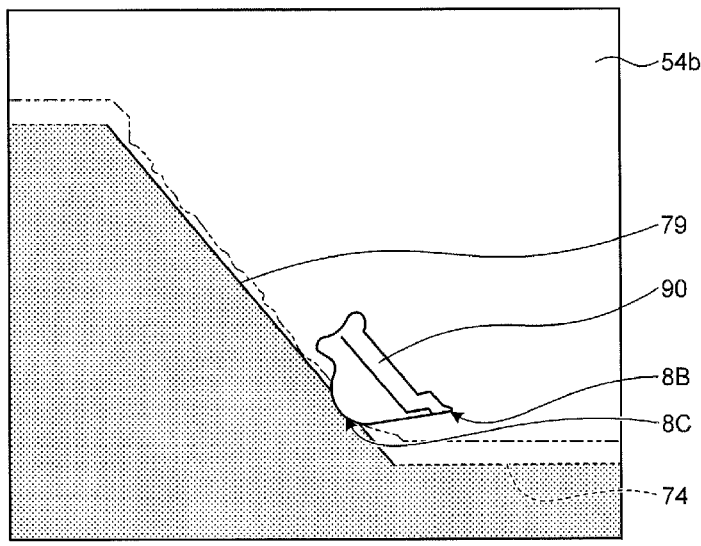
FIG. 17 is a diagram for describing collision between the bucket 8 and a design surface 70.
Figure 18:
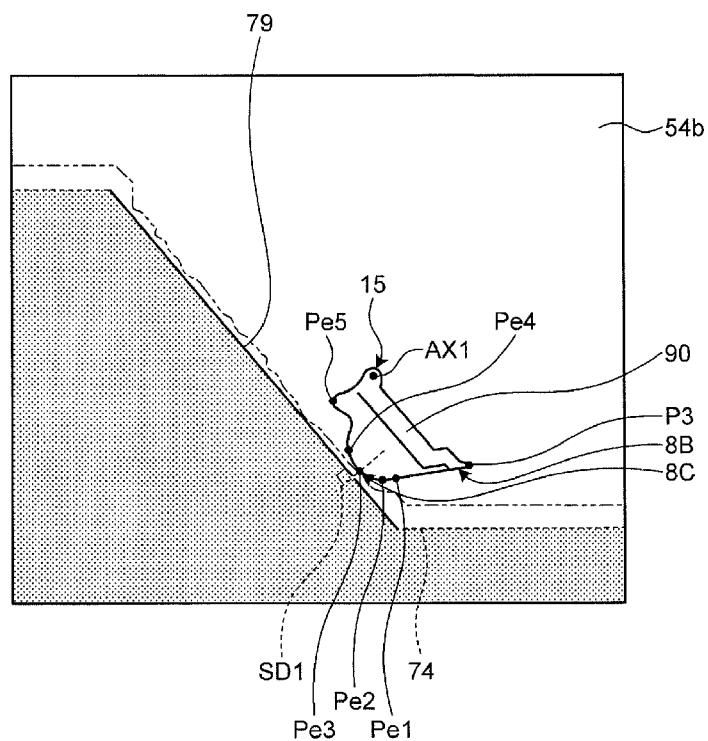
FIG. 18 is a diagram illustrating an example of displaying the shortest distance between the bucket 8 and the design surface.

FIG. 17 is a diagram for describing collision between the bucket 8 and a design surface. FIG. 18 is a diagram illustrating an example of displaying the shortest distance between the bucket 8 and the design surface. For example, when an operator operates the work machine 2 based only on the distance between the blade tip P3 of the bucket 8 and the design surface, the operator cannot determine that the buttock part 8C is closer to the design surface than the tip of the blade 8B of the bucket 8. As illustrated in FIG. 17, the operator may excavate the ground with the buttock part 8C of the bucket 8 beyond the line 79 indicating a cross section of the design surface. Therefore, for example, as illustrated in FIG. 18, the processing unit 44 in the present embodiment displays the image SD1 together with the icon 90 of the bucket 8 in the side view in the above-described side view 54*b* of the fine excavation screen 54. The image SD1 is an image of a normal line of the line 79 indicating a cross section of the design surface. The image SD1 passes through the measurement reference point Pen or the blade tip P3 (for example, Pe3) of the bucket 8, at which the design surface distance determined in Step S4 is the shortest distance. Therefore, the operator can know the shortest distance between the design surface and the bucket 8 including the buttock part 8C of the bucket 8 by viewing the image SD1 in the side view 54*b*. As a result, a possibility of excavating the ground with the buttock part 8C of the bucket 8 beyond the design surface can be reduced.

Figure 19:
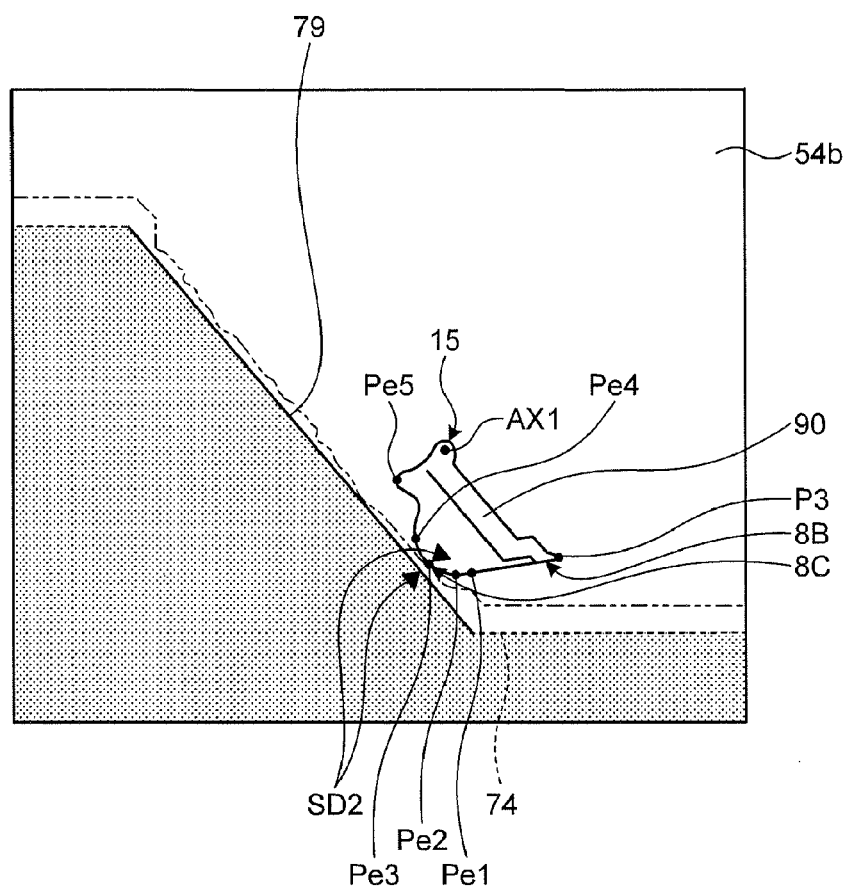
FIG. 19 is a diagram illustrating another example of displaying the shortest distance between the bucket 8 and the design surface.

Note that the image SD1 is not limited to the image represented by the dotted line. The image SD1 may be represented by a virtual line such as a solid line, a wavy line, a long dashed short dashed line, or a long dashed double-short dashed line. In the image SD1, patterns including dots, letters, and line drawings are continuous or scattered. The image SD1 includes a symbol by which the position of the measurement reference point Pen or the blade tip P3 of the bucket 8, at which the design surface distance is the shortest distance, can be determined at a glance. For example, FIG. 19 is a diagram illustrating another example of displaying the shortest distance between the bucket 8 and the design surface. For example, as illustrated in FIG. 19, the processing unit 44 in the present embodiment displays the image SD2 together with the icon 90 of the bucket 8 in the side view in the above-described side view 54*b* of the fine excavation screen 54. The image SD2 includes a triangle symbol specifying the measurement reference point Pen or the blade tip P3 (for example, Pe3) of the bucket 8, at which the design surface distance determined in Step S4 is the shortest distance. The image SD2 includes this triangle symbol and a triangle symbol in the normal direction of the line 79 indicating a cross section of the design surface and in contact with the line 79 indicating a cross section of the design surface. The distance between these triangle symbols may indicate the shortest distance between the bucket 8 and the design surface 70. Therefore, the operator can know the shortest distance between the design surface and the bucket 8 including the buttock part 8C of the bucket 8 between the triangle symbols of the image SD2 by viewing the image SD2 in the side view 54*b*. As a result, a possibility of excavating the ground with the buttock part 8C of the bucket 8 beyond the design surface can be reduced.

By viewing the image SD1 or SD2, the operator can easily recognize the measurement reference point Pen or the blade tip P3 of the bucket 8 closest to the design surface among the measurement reference points Pen and the blade tip P3 of the bucket 8. Therefore, by adjusting the boom cylinder 10, the arm cylinder 11, and the bucket cylinder 12, the operator can minimize a possibility of unintentionally excavating the design surface with the buttock part 8C of the bucket 8 or the like.

In the present embodiment, the display control device 39 emits a sound as an alarm based on the shortest distance between the bucket 8 and the design surface determined in Step S4. As a result, the display control device 39 can let the operator recognize a possibility of collision between the bucket 8 and the design surface. For example, when the shortest distance between the bucket 8 and the design surface determined in Step S4 exceeds a predetermined threshold (Yes in Step S6), the processing unit 44 determines that it is necessary to emit an alarm. The display control device 39 then causes the sound generating device 46 illustrated in FIG. 4 to emit an alarm sound (Step S7).

In this case, by changing a mode of emitting an alarm sound based on the distance between the bucket 8 and the design surface, the processing unit 44 can let the operator of the excavator 100 recognize that the bucket 8 is too close to the design surface. For example, as an example of changing the mode of emitting the alarm sound, the shorter the shortest distance between the bucket 8 and the design surface is, the higher the frequency of the sound is set. As another example of changing the mode of emitting the alarm sound, the shorter the shortest distance between the bucket 8 and the design surface is, the larger the volume of the sound is set. As still another example of changing the mode of emitting the alarm sound, the shorter the shortest distance between the bucket 8 and the design surface is, the shorter the cycle of the intermittent rumbling is set. By adjusting the boom cylinder 10, the arm cylinder 11, and the bucket cylinder 12, the operator who has recognized a possibility of collision between the bucket 8 and the design surface can minimize a possibility of unintentionally excavating the design surface with the bucket 8. When the shortest distance between the bucket 8 and the design surface determined in Step S4 does not exceed the predetermined threshold (No in Step S6), the processing unit 44 advances the processing to Step S8.

Subsequently, in Step S8, when the bucket 8 has not finished operating (No in Step S8), the processing unit 44 returns the processing to Step S2 to detect the current position of the excavator 100 and the posture of the main vehicle body 1. When the bucket 8 has finished operating (Yes in Step S8), the processing unit 44 finishes processing.

As described above, the display system 28 of the excavating machine is a system for operating the work machine 2 including the bucket 8 to generate an excavating force with the blade tip P3 and the main vehicle body 1 having the work machine 2 attached thereto. The display system 28 of the excavating machine includes the work machine condition detector 19, the storage unit 43, and the processing unit 44. The work machine condition detector 19 detects a current position of the excavator 100, a posture of the main vehicle body 1, and a current position of the blade tip P3. The storage unit 43 stores positional information of the design surface indicating a target shape of a work object and outer shape information of the bucket 8.

The processing unit 44 determines a position of the measurement reference point closest to the design surface among a plurality of measurement reference points Pen fixed in advance along the outer shape of the buttock part 8C of the bucket 8 for measuring a position, including at least the blade tip P3 of the bucket 8, based on the information on the current position of the excavator 100, the posture of the main vehicle body 1, the current position of the blade tip P3, and the outer shape information of the bucket 8.

When the operator operates the work machine 2 based only on the distance between the blade tip P3 of the bucket 8 and the design surface, the operator may not be able to determine that the buttock part 8C is closer to the design surface than the tip of the blade 8B of the bucket 8. The display system 28 of the excavating machine in the present embodiment can let the operator recognize the shortest distance between the design surface and the bucket 8 including the buttock part 8C of the bucket 8. As a result, a possibility of excavating the ground with the buttock part 8C of the bucket 8 beyond the design surface can be reduced.

The processing unit 44 determines the distance between the measurement reference point Pen and the design surface in a direction perpendicular to the design surface as the design surface distance. The processing unit 44 displays, on the screen 42P, information corresponding to the minimum value of the design surface distance as the shortest distance. In this way, the processing unit 44 can understandably provide information on the shortest distance between the design surface and the bucket 8, relating to an operation result, to an operator when the operator operates in accordance with the design surface. The processing unit 44 determines the distance between the measurement reference point Pen and the design surface in the direction perpendicular to the design surface as the design surface distance. Based on the information corresponding to the minimum value of the design surface distance, the processing unit 44 decreases a speed at which the bucket 8 comes closer to the design surface as the bucket 8 comes closer to the design surface. The processing unit 44 stops the work machine 2 when the distance between the bucket 8 and the design surface fixed in advance as a threshold is exceeded based on the information corresponding to the minimum value of the design surface distance. Therefore, the processing unit 44 can reduce a possibility of excavating the ground beyond the design surface.

The processing unit 44 determines a position of the measurement reference point closest to the design surface among a plurality of measurement reference points Pen fixed in advance along the outer shape of the buttock part 8C of the bucket 8 for measuring a position, including at least the blade tip P3 of the bucket 8, based on the information on the current position of the excavator 100, the posture of the main vehicle body 1, the current position of the blade tip P3, and the outer shape information of the bucket 8. The processing unit 44 then determines a distance between the measurement reference point Pen closest to the design surface and the design surface in the normal direction of the design surface as the shortest design surface distance. The display input device 38 displays, in the display unit 42, the shortest design surface distance determined and/or the image SD1 indicating the normal line of the design surface passing through the measurement reference point Pen closest to the design surface.

The display system 28 of the excavating machine in the present embodiment can let the operator view the image SD1 and thereby let the operator recognize the shortest distance between the design surface and the bucket 8 including the buttock part 8C of the bucket 8. As a result, a possibility of excavating the ground with the buttock part 8C of the bucket 8 beyond the design surface can be reduced.

In the present embodiment, for example, the side view 54b displayed on the above-described fine excavation screen 54 has been described. However, the side view 54b may be displayed on the coarse excavation screen 53. The processing unit 44 according to the present embodiment displays the above-described front view 54a and side view 54b as the front view (view when viewed in parallel to the Ya axis) and the side view (view when viewed in parallel to the Xa axis) in the main vehicle body coordinate system COM, respectively. The processing unit 44 may display at least one of the front view 54a and the side view 54b as a top view (view when viewed in parallel to the Y axis) or a side view (view when viewed in parallel to the X axis) in the global coordinate system.

The present embodiment has been described above. However, the present embodiment is not limited by the above description. The above-described components include components which can be easily conceived by a person skilled in the art and components substantially identical to the above-described components. In addition, the above-described components can be combined with each other appropriately. Furthermore, the components can be omitted, substituted, or modified variously within a range not departing from the gist of the present embodiment.

For example, the contents on each guidance screen are not limited to the above-described contents, and may be modified appropriately. A part or all of the functions of the display control device 39 may be performed by a computer disposed outside the excavator 100. The target work object is not limited to the plane as described above, and may be a dot, a line or a three-dimensional shape. The input unit 41 of the display input device 38 is not limited to that of a touch panel-type, and may include an operation member such as a hard key or a switch.

In the above-described embodiment, the work machine 2 includes the boom 6, the arm 7, and the bucket 8.

However, the work machine 2 is not limited to this structure, and is only required to include at least the bucket 8. In the above-described embodiment, the inclination angles of the boom 6, the arm 7, and the bucket 8 are detected by the first to third stroke sensors 16 to 18, respectively. However, a method for detecting the inclination angle is not limited to the method using these. For example, an angle sensor to detect the inclination angles of the boom 6, the arm 7, and the bucket 8 may be included.

In the above-described embodiment, the bucket 8 is included. However, the bucket is not limited to the bucket 8. For example, another attachment such as a tilt bucket or a slope bucket may be attached to the work machine 2. The tilt bucket is a bucket which includes a bucket tilt cylinder, can shape and level an inclined plane and a flat plane into a desirable shape by making the bucket tilt from side to side even if the excavator is on the slope, and can also perform a rolling operation with a low plate. The slope bucket is a bucket having a flat bottom and suitable for leveling the ground of a flat plane or a slope.

REFERENCE SIGNS LIST 1 main vehicle body
2 work machine
3 upper swing body
4 driving room
5 travel unit
8 bucket
8B blade
8C buttock part
19 work machine condition detector
21, 22 antenna
23 three-dimensional position sensor
24 inclination angle sensor
28 display system of excavating machine (display system)
38 display input device
39 display control device
41 input unit
42 display unit
42P screen
43 storage unit
44 processing unit
45 design surface
46 sound generating device 70 design surface
78, 79 line indicating cross section of design surface
84 graphic information
100 excavator

The invention claimed is:

1. A display system of an excavating machine including a work machine with a bucket and a main body part to which the work machine is attached, comprising:
   a work machine condition detector configured to detect information on a current position of the excavating machine, information on a posture of the main body part, and information on a position of a tip of the bucket;
   a storage unit configured to store positional information of a design surface indicating a design land shape and outer shape information of the bucket; and
   a processing unit configured to determine, among a plurality of measurement reference points predetermined along an outer shape of a buttock part of the bucket for measuring a position, including at least the tip of the bucket, a measurement reference point closest to the design surface, based on the information on the current position of the excavating machine, the information on the posture of the main body part, the information on the position of the tip of the bucket, and the outer shape information of the bucket.

2. The display system of an excavating machine according to claim 1, wherein
   the processing unit determines a distance between the measurement reference point and the design surface in a normal direction of the design surface as a design surface distance, and displays information corresponding to a minimum value of the design surface distance as a shortest distance on a screen of a display device.

3. The display system of an excavating machine according to claim 1, wherein
   the plurality of measurement reference points is predetermined along a cross section obtained by cutting the outer shape of the bucket with a plane parallel to a moving direction of the bucket and along a width direction of the bucket, and
   the processing unit determines a distance between the measurement reference point and the design surface in a normal direction of the design surface as a design surface distance, and displays information corresponding to a minimum value of the design surface distance as a shortest distance on a screen of a display device.

4. The display system of an excavating machine according to claim 2, wherein
   when there is a same measurement reference point in a plurality of normal directions of the design surfaces, the processing unit determines a plurality of design surface distances for the same measurement reference point.

5. The display system of an excavating machine according to claim 2, wherein
   the processing unit emits an alarm based on the shortest distance.

6. The display system of an excavating machine according to claim 5, wherein
   the processing unit changes a mode of emitting a sound as the alarm in accordance with the shortest distance.

7. The display system of an excavating machine according to claim 1, wherein
   the processing unit displays an image specifying a measurement reference point closest to the design surface on the screen of the display device.

8. The display system of an excavating machine according to claim 7, wherein
   the image specifying the measurement reference point closest to the design surface is an image indicating the normal line of the design surface.

9. A display system of an excavating machine including a work machine with a bucket and a main body part to which the work machine is attached, comprising:
   a work machine condition detector configured to detect information on a current position of the excavating machine, information on a posture of the main body part, and information on a position of a tip of the bucket;
   a storage unit configured to store positional information of a design surface indicating a design land shape and outer shape information of the bucket;
   a processing unit configured to determine, among a plurality of measurement reference points predetermined along an outer shape of a buttock part of the bucket for measuring a position, including at least the tip of the bucket, a measurement reference point closest to the design surface, based on the information on the current position of the excavating machine, the information on the posture of the main body part, the information on the position of the tip of the bucket, and the outer shape information of the bucket, and to determine a distance between the measurement reference point closest to the design surface and the design surface in a normal direction of the design surface as a design surface distance; and
   a display device configured to display at least one of the design surface distance and an image indicating the normal line of the design surface passing through the measurement reference point closest to the design surface.

10. An excavating machine comprising the display system of an excavating machine according to claim 9.

11. The display system of an excavating machine according to claim 3, wherein
    when there is a same measurement reference point in a plurality of normal directions of the design surfaces, the processing unit determines a plurality of design surface distances for the same measurement reference point.

12. The display system of an excavating machine according to claim 3, wherein
    the processing unit emits an alarm based on the shortest distance.

13. The display system of an excavating machine according to claim 12, wherein
    the processing unit changes a mode of emitting a sound as the alarm in accordance with the shortest distance.

14. An excavating machine comprising the display system of an excavating machine according to claim 1.

* * * * *